United States Patent
Yang

(10) Patent No.: US 10,522,040 B2
(45) Date of Patent: Dec. 31, 2019

(54) REAL-TIME VIDEO ANALYTICS FOR TRAFFIC CONFLICT DETECTION AND QUANTIFICATION

(71) Applicant: Kennesaw State University Research and Service Foundation, Inc., Kennesaw, GA (US)

(72) Inventor: Jidong J. Yang, Johns Creek, GA (US)

(73) Assignee: Kennesaw State University Research and Service Foundation, Inc., Kennesaw, GA (US)

(*) Notice: Subject to any disclaimer, the term of this patent is extended or adjusted under 35 U.S.C. 154(b) by 86 days.

(21) Appl. No.: 15/653,787

(22) Filed: Jul. 19, 2017

(65) Prior Publication Data

US 2018/0253973 A1 Sep. 6, 2018

Related U.S. Application Data

(60) Provisional application No. 62/466,953, filed on Mar. 3, 2017.

(51) Int. Cl.
*G08G 1/16* (2006.01)
*G08G 1/01* (2006.01)
(Continued)

(52) U.S. Cl.
CPC .......... *G08G 1/166* (2013.01); *G06K 9/00785* (2013.01); *G06K 9/00791* (2013.01);
(Continued)

(58) Field of Classification Search
CPC .............. G05D 1/0214; G05D 1/0276; G06K 9/00785; G06K 9/00791; G06K 9/00805;
(Continued)

(56) References Cited

U.S. PATENT DOCUMENTS

2008/0040023 A1 2/2008 Breed et al.
2008/0167819 A1* 7/2008 Breed ................... G08G 1/161
701/300
(Continued)

FOREIGN PATENT DOCUMENTS

CN 103236191 A 8/2013
WO WO 2014/020315 A1 2/2014
WO WO 2015/188905 A1 12/2015

OTHER PUBLICATIONS

International Patent Application No. PCT/US2018/020767; Int'l Search Report and the Written Opinion; dated Aug. 22, 2018; 21 pages.

*Primary Examiner* — Atul Trivedi
(74) *Attorney, Agent, or Firm* — Smith, Gambrell & Russell LLP

(57) ABSTRACT

A video analytics algorithm, system, and method for use in real time allowing accurate, reliable, and timely warnings that facilitate traffic safety and efficiency. The system and method are readily implemented with minimal computational resources, providing broad applicability. In an embodiment, a video analytics method may include (a) obtaining a sequence of real-time images as input from a traffic monitoring system; (b) identifying a plurality of vehicles within a pre-defined region of interest; (c) tracking vehicles within the predefined region of interest; and (d) detecting a conflict event when the vehicles are located within a pre-determined maximum separation threshold based on each vehicles coordinates in a spatial-temporal domain.

20 Claims, 17 Drawing Sheets

(51) Int. Cl.
*G06K 9/00* (2006.01)
*G08G 1/04* (2006.01)
*G08G 1/095* (2006.01)

(52) U.S. Cl.
CPC ....... *G06K 9/00805* (2013.01); *G08G 1/0112* (2013.01); *G08G 1/0116* (2013.01); *G08G 1/0129* (2013.01); *G08G 1/0133* (2013.01); *G08G 1/0141* (2013.01); *G08G 1/04* (2013.01); *G08G 1/095* (2013.01); *G08G 1/164* (2013.01)

(58) Field of Classification Search
CPC .. G08G 1/0112; G08G 1/0116; G08G 1/0129; G08G 1/0133; G08G 1/0141; G08G 1/04; G08G 1/095; G08G 1/164; G08G 1/166
USPC ........................................................ 701/301
See application file for complete search history.

(56) References Cited

U.S. PATENT DOCUMENTS

| | | |
|---|---|---|
| 2011/0071750 A1 | 3/2011 | Giovino et al. |
| 2014/0372016 A1 | 12/2014 | Buchholz et al. |
| 2015/0365664 A1* | 12/2015 | Yousefi ................. H04N 7/183 375/240.02 |
| 2016/0260328 A1* | 9/2016 | Mishra .................... G08G 1/163 |
| 2017/0053169 A1* | 2/2017 | Cuban .................... H04N 7/185 |
| 2017/0154241 A1* | 6/2017 | Shambik .................. B60R 1/00 |
| 2017/0177937 A1* | 6/2017 | Harmsen ................. G06T 7/579 |
| 2017/0206238 A1* | 7/2017 | Coutinho ................ H04W 4/70 |
| 2018/0075309 A1* | 3/2018 | Sathyanarayana ... G05D 1/0088 |
| 2018/0212684 A1* | 7/2018 | Aoyama ............... G06F 1/1626 |
| 2018/0239982 A1* | 8/2018 | Rutschman ............ G06K 9/209 |
| 2018/0365635 A1* | 12/2018 | Lucrecio ............ G06Q 10/0833 |

\* cited by examiner

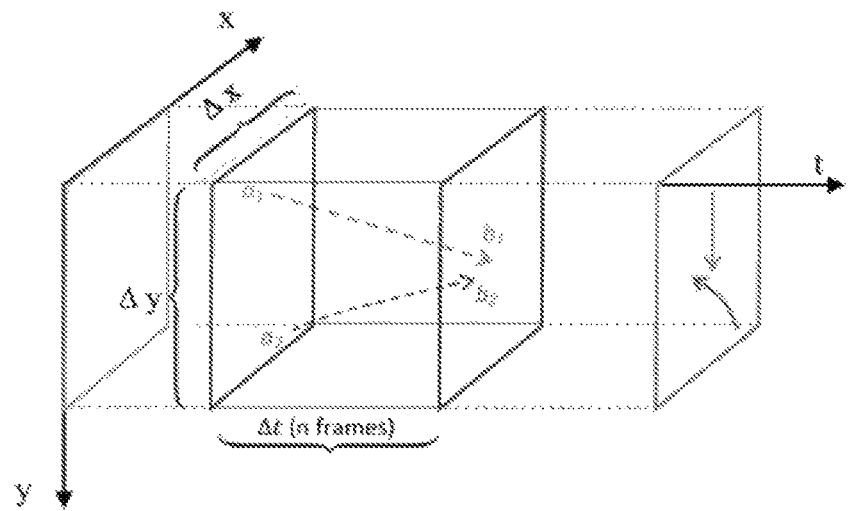
FIG. 4A
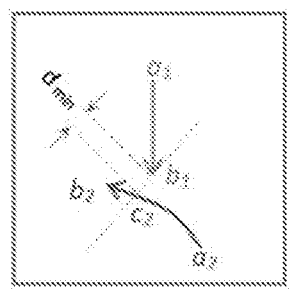     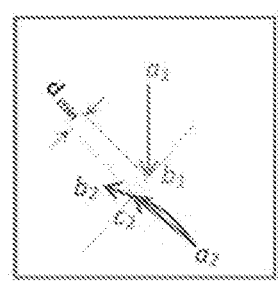
FIG. 4B          FIG. 4C
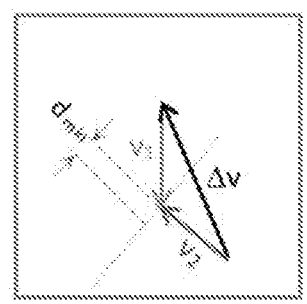
FIG. 4D

Change conflict | traffic conflicts

127.0.0.1:8000/admin/conflicts/conflic/99/change/

Traffic Conflicts Administration

Home > Conflicts > Conflicts > Conflict obect

Change conflict

- C type: 0
- S1: 33.5410196624969
- A1: 206.565051177078
- St1 x: 399
- St1 y: 270
- Cp1 x: 400
- Cp1 y: 272
- S2: 50.7318613871968
- A2: 219.207203504958
- St2 x: 365
- St2 y: 228
- Cp2 x: 396
- Cp2 y: 266
- Min dist: 10.8224304109567
- Delta v: 19.443047719875
- P: 0.0748891994485415
- Severity: 1.45607427858123
- Intersection: Intersection object

[Delete]  [Save and add another]  [Save and continue editing]  [Save]

FIG. 12

| Local instance MySQL | + | | | | | | | | | | |
|---|---|---|---|---|---|---|---|---|---|---|---|
| Query 1 | conflicts_intersection x | | | | | | | | | | |

SELECT FROM mydb.conflicts_conflict

Result Grid

| id | c_type | s1 | a1 | severity | p | time | s2 | a2 | cp1_x | cp1_y | cp2_x | cp2_y | min_dist | delta_v |
|---|---|---|---|---|---|---|---|---|---|---|---|---|---|---|
| 90 | 1 | 59.1919427... | 5.01311... | 0.3215... | 0.0052... | 2017-07-14 03:44:56.933835 | 2.925959... | 225 | 413 | 254 | 385 | 253 | 19.81... | 61.46... |
| 91 | 3 | 23.4727401... | 222.273... | 1.6197... | 0.0180... | 2017-07-14 03:44:58.524907 | 67.08203... | 26.56... | 394 | 263 | 413 | 256 | 15.66... | 89.90... |
| 92 | 1 | 35.3090651... | 5.04245... | 0.4860... | 0.0052... | 2017-07-14 03:45:06.747846 | 61.60168... | 220.9... | 419 | 320 | 419 | 292 | 19.79... | 92.55... |
| 93 | 1 | 58.1614874... | 5.10216... | 0.3608... | 0.0060... | 2017-07-14 03:45:28.907770 | 1.034482... | 180 | 414 | 260 | 387 | 256 | 19.30... | 59.19... |
| 94 | 3 | 21.2758718... | 220.601... | 1.8292... | 0.0208... | 2017-07-14 03:45:30.865996 | 67.08203... | 26.56... | 394 | 263 | 413 | 255 | 15.18... | 87.87... |
| 95 | 0 | 10 | 270 | 0.8399... | 0.0210... | 2017-07-14 03:45:32.531444 | 45.10392... | 216.6... | 390 | 259 | 379 | 246 | 15.14... | 39.95... |
| 96 | 0 | 10 | 270 | 2.0164... | 0.0512... | 2017-07-14 03:45:35.039436 | 49.45000... | 217.3... | 394 | 263 | 387 | 256 | 12.12... | 39.31... |
| 97 | 0 | 30 | 270 | 2.6074... | 0.0645... | 2017-07-14 03:45:36.697565 | 51.53759... | 218.4... | 396 | 266 | 391 | 260 | 11.33... | 40.39... |
| 98 | 3 | 30 | 270 | 2.9523... | 0.0705... | 2017-07-14 03:45:38.650706 | 52.71820... | 217.5... | 398 | 269 | 393 | 263 | 11.02... | 41.84... |
| 99 | 0 | 33.5410196... | 206.565... | 1.4560... | 0.0748... | 2017-07-14 03:45:40.295459 | 50.73186... | 219.2... | 400 | 272 | 396 | 266 | 10.82... | 19.44... |
| 100 | 1 | 55.5765903... | 4.76364... | 59.529... | 0.2987... | 2017-07-14 03:45:43.030825 | 150 | 216.8... | 418 | 308 | 417 | 300 | 5.798... | 199.2... |

| st | delta_v | intersection_id | st1_x | st1_y | st2_x | st2_y |
|---|---|---|---|---|---|---|
| ... | 61.46... | 1 | 418 | 311 | 383 | 251 |
| ... | 89.90... | 1 | 384 | 252 | 414 | 258 |
| ... | 92.55... | 1 | 422 | 354 | 380 | 247 |
| ... | 59.19... | 1 | 419 | 316 | 387 | 255 |
| ... | 87.87... | 1 | 388 | 256 | 414 | 257 |
| ... | 39.95... | 1 | 389 | 259 | 353 | 211 |
| ... | 39.31... | 1 | 393 | 263 | 358 | 218 |
| ... | 40.39... | 1 | 395 | 266 | 360 | 221 |
| ... | 41.84... | 1 | 397 | 269 | 363 | 224 |
| ... | 19.44... | 1 | 399 | 270 | 365 | 228 |
| ... | 199.2... | 1 | 422 | 356 | 411 | 292 |

FIG. 13

REAL-TIME VIDEO ANALYTICS FOR TRAFFIC CONFLICT DETECTION AND QUANTIFICATION

BACKGROUND

A video analytics algorithm, system, and method. A motorway, i.e., expressway or highway, ramp safety warning method is used that is free from environmental constraints, permitting all vehicles to be included in the range of real-time video, thus providing a reliable and early warning. The method is easy to implement, is highly accurate, is suitable for real-time traffic safety warning for any highway or motorway, and thus has broad application.

Prior art methods lack these features and benefits, instead disclosing traditional safety surrogate measures that lack efficient and/or effective capture of real-time traffic conflicts in the context of multiple moving vehicles, such as at intersections.

As one example, CN 103236191 discloses a video-based safety precaution method for vehicles merging from a highway ramp using a time difference conflict possibility. It incorporates a security alarm video-based vehicle freeway ramp through the exit ramp where two cameras detect motion of the vehicle and two roads in the same direction, calibrate vehicle trajectory based on continuous tracking frame vehicle trajectory through the operation to obtain the actual movement distance, and then obtain the actual speed of the vehicle. The incorporated area of the time difference by the speed of the two vehicles on the road determines the vehicle time difference conflict possibility.

As another example, WO 2014/020315 detects a moving vehicle by receiving image data representing a sequence of image frames over time. It analyzes the image data to identify potential moving vehicles, and compares the potential moving vehicle with a vehicle movement model that defines a trajectory of a potential moving vehicle to determine whether the potential moving vehicle conforms with the model.

As another example, US 2011/0071750 detects vehicles including aircraft by reducing a vehicle travel path in a three dimensional space to a first dimension; receiving data corresponding to a motion of the vehicle, i.e., aircraft; mapping the motion to the vehicle travel paths in the first dimension; and transmitting an alert if a potential conflict is determined in the vehicle travel paths in the first dimension.

Given the complexity and subtlety of conflict events (e.g., a dangerous near-miss scenario), a human observer has conventionally been required to detect a true conflict. Recent focus is on automating conflict identification and quantification using a safety surrogate measure such as time-to-collision (TTC), post-encroachment time (PET), potential time to collision (PTTC), difference in vehicle speeds (DeltaS), initial deceleration rate of the second vehicle (DR), the maximum deceleration of the second vehicle (MaxD), difference in velocities (DeltaV), and safe Stopping Distance (SSD). The Federal Highway Administration developed a surrogate safety assessment model [1], which allows for an expedited safety assessment. Micro-simulation models to extract vehicle trajectories, and a significant number of simulation runs, are conventionally required for meaningful statistical inferences. Other research studies have extracted surrogate measures from video images based on spatial or temporal proximity of two or more conflicting road users. An Extended Delta V measure has been proposed to integrate the proximity to a crash, as well as the outcome severity in the event a crash would have taken place, both of which are important dimensions in defining the severity of a traffic conflict event. Prior art methods typically use one or more simplified indicators (e.g., TTC, PET, DR, etc.) to identify a conflict event, but each indictor has drawbacks. Given the complexity, variety, and subtlety of conflict events, a true conflict may not be identifiable by any of those indictors because those indicators were mostly based on partial aspects of conflict events. Simulation-based conflict analysis relies on predictive modeling of trajectories, is computationally demanding, is not suited for real-time applications, and has questionable accuracy and reliability. Conflict severity has been estimated based on an Extended Delta V, which assumes that the two road users spent the time available to brake before arriving at the collision point. For this reason, driver behaviors (e.g., deceleration rates) and collision mechanism (e.g., inelastic collision) have to be assumed to calculate the metric.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A-4D illustrate relative velocity determination with trajectories.

FIG. 12 shows a screen capture of a site administrator interface in accordance with an embodiment of the present disclosure.

FIG. 13 shows a screen capture of a database interface with multiple conflict events in accordance with an embodiment of the present disclosure.

DETAILED DESCRIPTION

Figure 1A:
FIGS. 1A-D show geospatial references, with FIGS. 1A and 1B showing the geospatial relationship of the camera view and plan view, FIG. 1C showing vehicles being tracked in the camera view, and FIG. 1D showing corresponding mapping in the plan view.
Figure 1B:
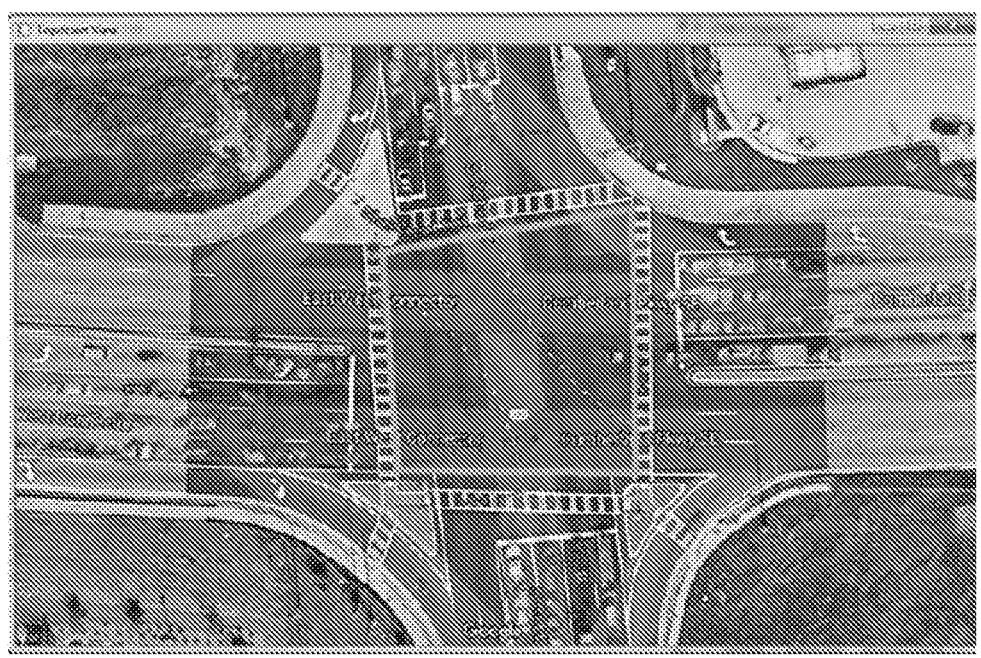
Figure 1C:

The inventive method and system may provide practical and readily implementable detection and quantitation of traffic conflicts in real time, permitting roadway safety to be monitored and assessed in real time using live or streaming traffic video, e.g., traffic cameras. The method may proactively permit corrective actions and/or improvements to be timely deployed resulting in a safer road environment for the travelling public. This benefits public agencies, private entities responsible for operating and maintaining roadway systems, autonomous vehicle/self-driving car technologies that can use the inventive method and system to evaluate safety in both pilot and deployment stages, law enforcement agencies, etc.

The video analytics algorithms can be implemented in a standalone application software or firmware, or packaged in an online service to which interested parties may subscribe using, e.g., a web hosting and cloud computing service.

A "traffic conflict" may be a near-collision situation or a "potential" crash. Its use is accepted for highway safety diagnosis because it does not require extensive observation periods and provides information into the failure mechanism leading to road collisions. Unlike traffic crashes, which are typically entered by a police officer in a crash database during the crash scene investigation, traffic conflict events are not currently reported or recorded.

The inventive system and method may provide a practical procedure and/or algorithm to detect and quantify traffic conflict events by analyzing the relationship of trajectories of vehicles extracted from live or streaming traffic video. Few computational resources are required, and these are implemented to detect, classify, quantify, and log traffic conflicts in real time, resulting in a practical tool that may reveal potential deficiencies or opportunities, for which proactive engineering or non-engineering solutions may allow timely improvements.

The inventive method and system defines conflict in a joint spatial-temporal domain (x, y, t) and computes a severity measure based on a surrogate velocity equivalent measure derived from trajectories revealed within a sliding tracking window ($\Delta t$). The spatially and temporally constrained space ($\Delta x$, $\Delta y$, $\Delta t$) that encloses the tracked trajectories is referred to as a tracking prism. It is based on actual spatial-temporal data extracted from live or steaming video. No specific assumptions need to be made for driver behavior. Because of its simplicity, there is minimal consumption of computing resources, and live images may be processed and analyzed in real time to simultaneously detect, classify, quantify, and log traffic conflict events for proactive road safety diagnosis and improvement. Specifically, characterization and representation of conflict events may be based on trajectories captured within a tracking prism, which may slide one frame at a time in synchronization with the live or streaming video. Conflict events may be detected based on a closeness measure of vehicles in conflict. The closeness measure may be defined in a joint spatial-temporal (x, y, t) domain. Tracking and detection may be improved by accounting for movement-specific features and/or right-of-way rules. Each movement may be assigned a unique identification (ID) number. The conflicts may be classified based on the approaching angles of vehicles and associated movement IDs. The severity of traffic conflict may measured based on equivalent velocities of vehicles prior to the identified conflict points on the trajectories.

The inventive method may take a live image as input from a traffic monitoring camera (such as those currently used by highway agencies) and may process the sequence of images by the proposed video analytics procedure and/or algorithm in real time. The video analytics procedure and/or algorithm may include one or more of the following steps:

Step 1 obtains the spatial and temporal position (x, y, t) of moving vehicles from a video source (e.g., a live camera, a network camera, a recorded video, etc.) over a defined tracking prism comprising an equivalent number of successive frames. Step 1 may entail tracking the center points (x, y) of all moving objects and assign a time stamp (t) relative to the tracking window. Step 2 obtains the center points (x, y) obtained in step 1 on a plan view, i.e., a top-down view, by geospatially referencing the two views (i.e., camera view and plan view). This generates a corresponding sequence of dot-featured image frames on the plan view of the location being monitored. Step 3 operates on the plan-view images obtained from step 2 and extracts trajectories of moving objects revealed in the tracking prism. Step 4 identifies conflicts. By inspecting trajectories manifested within the sliding tracking prism every time step, a true conflict can be detected based on closeness or separation of the trajectories in the joint spatial-temporal (x, y, t) domain. Step 5 characterizes and quantifies conflicts. Based on conflict points (defined as the points on conflicting trajectories, where the minimum separation is measured from in the (x, y, t) domain, the approaching velocity (magnitude and direction) of each vehicle is estimated based on the portion of trajectory prior to its conflict point. The angles of approaching velocities combined with their movement IDs are used to characterize the type of conflict (e.g., northbound left turn vs. southbound through). The magnitude of difference in velocities of approaching vehicles, coupled with a probability function conditional upon the separation measure in the (x, y, t) domain, computes a conflict severity measure. These steps may be implemented iteratively by sliding the tracking prism one frame at a time in synchronization with live or streaming video sources.

The inventive video analytics procedure and/or algorithm may be implemented through a software or an online service protocol.

The inventive method and system detects and quantifies traffic conflict events from live or streaming traffic video sources (e.g., traffic monitoring cameras) in real time. Video analytics algorithms have been developed to process a sequence of images captured within a sliding prism in a temporal-spatial domain, revealing information on the relative temporal-spatial closeness of potential conflicting vehicles and their approaching velocities and avoidance behaviors.

The live video analytics algorithm may involve one or more of the following steps:

Step 1 obtains the spatial-temporal positions (x, y, t) of vehicles. Points (x, y, t) representing vehicles from a video source (e.g., a live camera, a network camera, a recorded video, etc.) over a sliding tracking window (or an equivalent sequence of frames of images) are obtained. This entails tracking the center points (x, y) of all moving vehicles and assigning a time stamp (t) relative to the starting point of the tracking window. The three-dimensional (x, y, t) space that encloses all potential points (x, y, t) is referred to as a tracking prism.

Figure 1D:
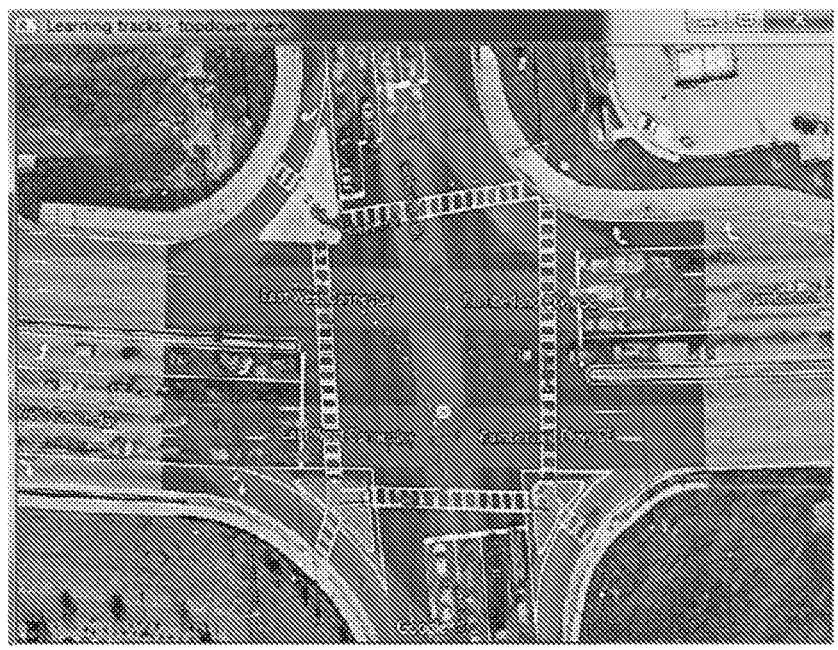

Step 2 represents the vehicle center points (x, y) in a plan (top-down) view. The corresponding center points (x, y) obtained in step 1 are obtained on a plan view by geospatially referencing the two views, i.e., camera view and plan view, for each frame (t). This process generates a corresponding sequence of dot-featured images on the plan view, as may be seen with reference to FIG. 1D.

This geospatial reference may be seen with reference to FIGS. 1A-1D. By referencing four corresponding points as specified by users, e.g., four vertices of the polygon shown in FIGS. 1A and 1B, the geospatial relationship of the two views, camera view and plan view, is obtained. As a result, any points on the camera view can be geospatially referenced or "mapped" onto the plan view. As shown, the vehicles tracked in the camera view in FIG. 1C were mapped in the plan view in FIG. 1D.

Figure 2:
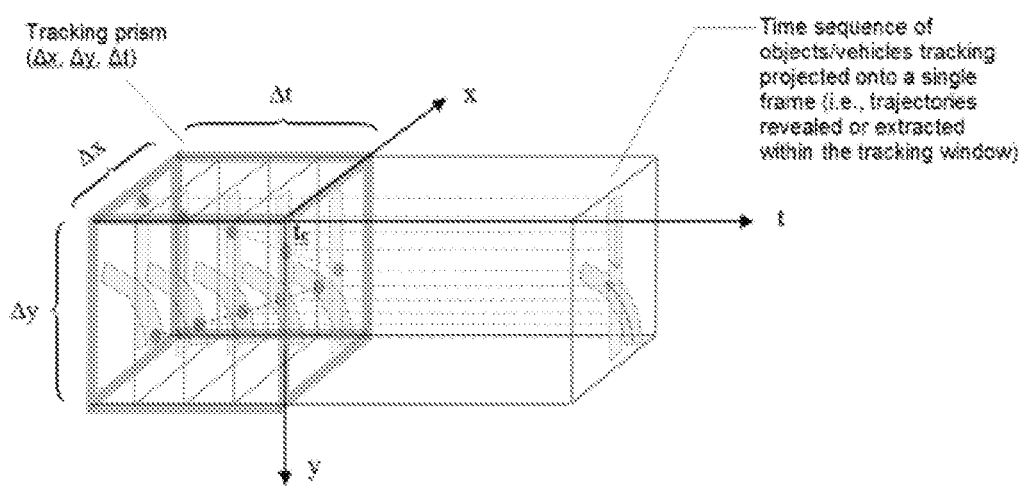
FIG. 2 shows an exemplary identification of trajectories of moving vehicles in the ($\Delta x$, $\Delta y$, $\Delta t$) domain.

Step 3 extracts trajectories of movements operating on the mapped plan-view images obtained in Step 2. The length of the image sequence, i.e., the number of successive frames, defines the temporal dimension (shown as $\Delta t$ in FIG. 2) of the tracking prism (the constrained volume of ($\Delta x$, $\Delta y$, $\Delta t$) defined by thicker purple lines in FIG. 2), which slides one frame at a time in synchronization with the real-time video source. Given the centers of vehicles, represented as dots in FIG. 2, tracked in the spatial-temporal domain, the immediately past trajectories of vehicles captured within the sliding tracking prism are identified and extracted. If the current time is tc as indicated in FIG. 2, the tracking prism will end at tc. As time progresses, this prism will slide along with tc. To extract the trajectories in this sliding prism, a simple heuristics and/or a density-based classification or cluster analysis (e.g., DBSCAN) can be employed in the joint spatial-temporal ($\Delta x$, $\Delta y$, $\Delta t$) domain. The aim is to recognize trajectories as patterns of dots within the space of the tracking prism ($\Delta x$, $\Delta y$, $\Delta t$). To improve accuracy and robustness in extracting trajectories, a "track", represented by a polygon, can be defined for each distinct movement. For example, FIG. 2 illustrates two track polygons, i.e., one southbound through movement in orange and one northbound left turn movement in blue, assuming the north points up. Defining a confining track for each movement advantageously allows classification or cluster analysis to be performed within each track polygon to improve the accuracy of distinguishing trajectories and to reduce computing time as well, and allows assigning a movement identity to each trajectory so that the types of conflicts can be identified based on the identity assigned. For example, FIG. 2 shows a conflict between the permissive northbound left turn movement and the southbound through movement. It should be noted that the proposed conflict detection procedure or algorithm can be applied regardless of methods used for existing trajectories. Some existing detection and tracking algorithms could be used for extracting trajectories of multiple objects, which may require additional computing power to render real-time operations.

The dashed lines that connect the dots in FIG. 2 depicts the actual trajectories of the two vehicles (represented by orange dots and blue dots) revealed within the tracking prism ($\Delta x$, $\Delta y$, $\Delta t$). The classification or cluster analysis (for extracting trajectories) is performed in the joint spatial-temporal ($\Delta x$, $\Delta y$, $\Delta t$) domain. The temporal dimension ($\Delta t$) is included in order to separate the dots that are close or "overlapping" in the spatial ($\Delta x$, $\Delta y$) domain, but that actually belong to different trajectories. For example, if two trajectories are crossing each other within the tracking window, the dots from two conflicting trajectories will be very close or overlap in the ($\Delta x$, $\Delta y$) domain. Inclusion of time dimension ($\Delta t$) may help to separate the dots of different trajectories in the "overlapping" area since those dots will have different time stamps. An actual collision, and not a conflict, would have occurred if the dots tracked in conflicting trajectories come really close in all three dimensions (x, y, t).

FIG. 2 illustrates identification of trajectories of moving vehicles within the tracking prism ($\Delta x$, $\Delta t$).

As FIG. 2 shows, by jointly considering both spatial and temporal dimensions, a sequence of image frames (each image is two-dimensional in the spatial ($\Delta x$, $\Delta y$) domain) is tracked over the temporal ($\Delta t$) dimension (i.e., with a time stamp assigned to each image frame with respect to the starting point (tc-$\Delta t$) of the sliding tracking window), resulting in a rectangular tracking prism of size ($\Delta x$, $\Delta y$, $\Delta t$), illustrated by the thick lines in purple.

Step 4 identifies conflicts. Inspecting trajectories in the prism ($\Delta x$, $\Delta y$, $\Delta t$) detects and quantifies a true conflict depending on their closeness or separation in the ($\Delta x$, $\Delta y$, $\Delta t$) domain. Each vehicle has its physical dimensions and the centers of vehicles (dots) are used to generate trajectories. Thus, the separation of any pair of trajectories in the ($\Delta x$, $\Delta y$, $\Delta t$) domain cannot be less than a factual "minimum" value constrained by the physical dimensions of objects or vehicles. Otherwise, a collision is implied since the objects or vehicles are actually coming into contact, i.e., occupy nearly the same spot (x, y) at the same time (t).

As a substitute measure for collision, a conflict may be defined as any two conflicting trajectories in the spatial-temporal domain ($\Delta x$, $\Delta y$, $\Delta t$) that are less than a "maximum" separation threshold, but greater than a "minimum" separation that defined by the physical dimensions of vehicles. As such, a separation measure can be defined by Eq. (1) below for any pair of conflicting trajectories in the tracking prism ($\Delta x$, $\Delta y$, $\Delta t$) based on a "shortest" Euclidean distance.

$$d_{i,j} = \sqrt{(x_i - x_j)^2 + (y_i - y_j)^2 + (t_i - t_j)^2} \quad (1)$$

Given the two distinct dimension measures, i.e., space (x, y) and time (t), a scaling factor may be used, so Eq. (1) can be rewritten as:

$$d_{i,j} = \sqrt{\alpha[(x_i - x_j)^2 + (y_i - y_j)^2] + (1 - \alpha)(t_i - t_j)^2} \quad (2)$$

where, $\alpha$ is the scaling factor, $0 \leq \alpha \leq 1$.

Given a specific $\alpha$, the shortest separation can be found by minimizing Expression (3) subject to all points being on the conflicting trajectories, for example, as follows:

$$\min_{x,y,t}[d_{i,j}^2] = \min_{x,y,t}\{\alpha[(x_i - x_j)^2 + (y_i - y_j)^2] + (1 - \alpha)(t_i - t_j)^2\} \quad (3)$$

Subject to:

$(x_i, y_i, t_i) \in$ trajctory $i$ and $(x_j, y_j, t_j) \in$ trajctory $j$

Varying α from 0 to 1 produces a Pareto frontier. Practically, α is a weighting factor, indicating the importance of spatial closeness versus the importance of temporal closeness. The higher the α value, the more important the spatial closeness will be. A lower α value give more weight or importance to the temporal closeness. Two boundary conditions are (1) α=0, which indicates only time separation is considered in defining a conflict and (2) α=1, which indicates only spatial separation is considered in defining a conflict.

Figure 3A:
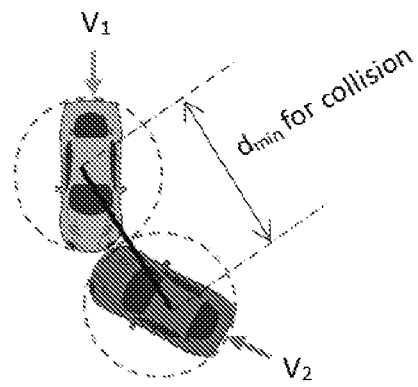
FIGS. 3A-D show minimum distance for collision and conflicts, with FIG. 3A showing the minimum separation (essentially zero because of physical contact) for collision, FIG. 3B showing both vehicles in conflict slowing to avoid a potential collision, FIG. 3C showing vehicle with right of way slowing to avoid a potential collision, and FIG. 3D showing a near-miss of two vehicles in relatively high speed.

Based on the definition above, a minimum separation of two conflicting trajectories less than a "maximum" threshold implies that the two subject vehicles are moving close enough, both spatially and temporally, to be considered as a conflict. In this case, the point on each trajectory where the minimum distance was measured is defined as "conflict points." Based on this definition, there are two conflict points, one on each trajectory of two conflicting vehicles. Because points on trajectories represent the centers of vehicles, the physical vehicle dimensions must be considered in defining the "maximum" threshold for this minimum separation. When the two conflict points are close enough to reach the limit of physical dimensions of two conflicting vehicles, it indicates a collision or crash as seen in FIG. 3A which can be considered as a special or extreme case of conflict. Typical scenarios of conflict are illustrated in FIGS. 3B, 3C, and 3D, depending on the velocities of approaching vehicles, who has the right of way, and whether they were braking or not prior to the conflict points.

Figure 3B:
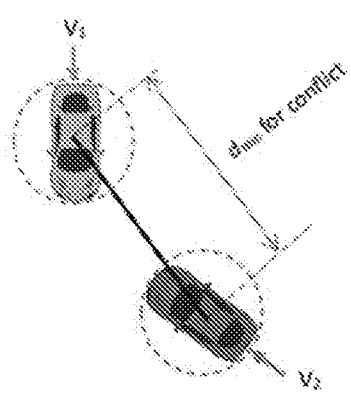
Figure 3C:
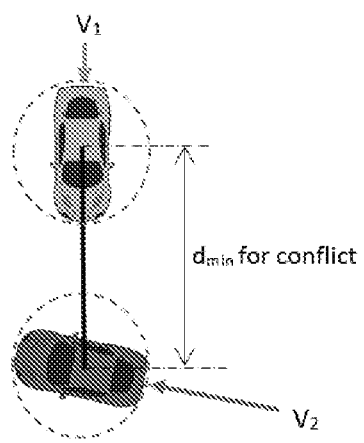
Figure 3D:
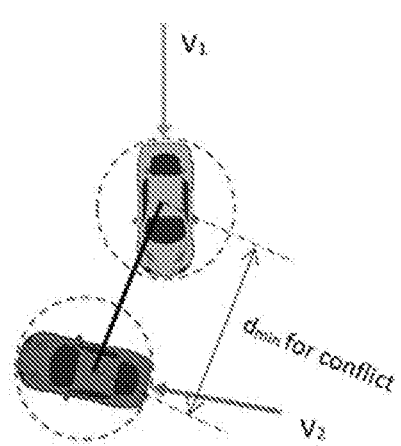

FIGS. 3A-D illustrate examples of minimum distance for collision and conflicts. The example of FIG. 3A illustrates a minimum separation dmin for a collision, which may be defined as vehicles making physical contact. The example of FIG. 3B illustrates vehicles V1 and V2 that have each slowed down (braked) to avoid a potential collision. Illustrated in FIG. 3B is an exemplary minimum separation dmin for a non-collision conflict event. In FIG. 3C, vehicle V2 was travelling at a higher speed, and vehicle V1 slowed down (braked) to avoid a potential collision. In the scenario of FIG. 3C, vehicle V1 may have had a higher priority right of way but still slowed down to yield to vehicle V2 that had a lower priority right of way. In the example scenario of FIG. 3D, both vehicle V1 and vehicle V2 have relatively high speeds. In the scenario of FIG. 3D, vehicle V2 passed the conflict area, and vehicle V1 is about to pass the conflict area immediately after vehicle V2. This type of scenario represents a near-miss conflict.

In FIG. 3D, V1 is the vehicle that has the higher right-of-way priority; V2 is the vehicle that has the lower right-of-way priority; dmin is the minimum separation in x, y, t domain that is calculated per Eq. (3); and the arrow indicates the velocity of vehicles, where a longer arrow indicates a higher speed.

Step 5 characterizes and quantifies traffic conflicts. As defined previously, the conflict points are the points on conflicting trajectories, where the minimum separation (dmin) is measured in the (Δx, Δy, Δt) domain. Once a conflict point is identified for a trajectory, the approaching velocity (magnitude and direction) of each vehicle is estimated based on the portion of trajectory prior to this conflict point. Then, the relative velocity (difference in velocity) of two conflicting vehicles prior to their respective conflicting points is determined. This relative velocity indicates how severe a collision would be if it had happened; as such, relative velocity is used to assess the severity of a conflict based on its potential consequence implied from relative velocity.

FIGS. 4A-4D illustrate an exemplary process for determining relative velocity. This process is continued as the tracking prism slides along the temporal dimension in real time in synchronization with a video source, for example, as shown in FIG. 4A In FIG. 4A, the frame in green is a projection of the prism (Δx, Δy, Δt) onto the (x, y) plane and shows the projection of two trajectories in the tracking prism (trajectory 1: a1->b1; trajectory 2: a2->b2) to the spatial (x, y) domain. FIG. 4B shows dmin, which was calculated to be between the point b1 on trajectory 1 and the point c2 on trajectory 2. Points, i.e., b1 and c2 in this example are referred to as conflict points. The distance is the shortest in (x, y, t) domain but not necessarily the shortest in (x, y) domain. In FIG. 4C, the portion of trajectories before the conflict points, i.e., b1 and c2, is used to compute a velocity measure for each vehicle. The velocity measure is defined as a vector by connecting the beginning point and the conflict point of each trajectory. The "velocity measure" used here is in unit of straight-line distance over the corresponding time interval, which is the tracking time window Δt or a fraction of it. Given the straight-line approximation for curved trajectories, the velocity measure defined as such is a surrogate measure of true velocity. For example, the velocity measure for trajectory 1 is shown as vector a1->b1 (in orange) divided by the corresponding time interval and the velocity measure for trajectory 2 is shown as vector a2->c2 (in red) divided by the corresponding time interval. Note that the corresponding time intervals can be determined based on the number of frames covered and the frame-per-second rate. In the illustration of FIG. 4D, one of the velocity measures is moved in parallel along the line (where the dmin was measured) until the two dmin points overlap. A difference in velocity (Δv) may be obtained via vector subtraction. The magnitude of Δv and the angle between the two velocity measures may be used to determine conflict type and severity. Note that the approaching velocities could be defined based on the tangent line at the conflict points, which would require a higher level of accuracy in detection and tracking.

Figure 5A:
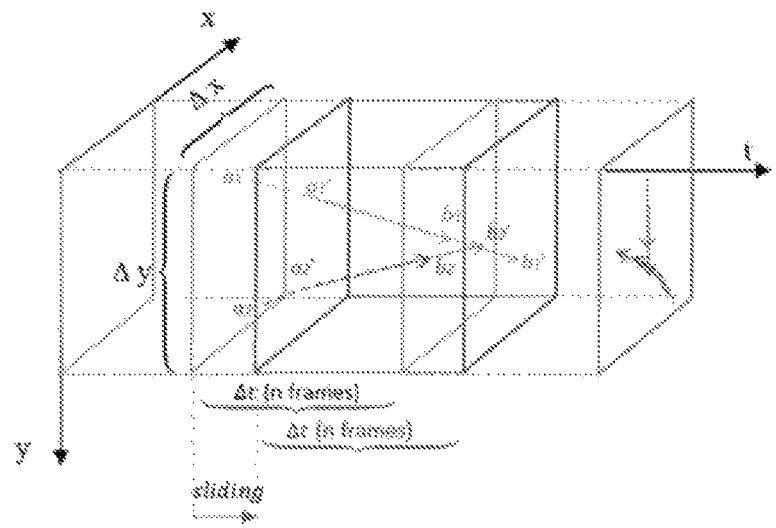
FIGS. 5A-5E show progression of the trajectories in FIG. 4 as a tracking prism slides along the time dimension, which results in a smaller minimum separation (dmin).
Figure 5B:
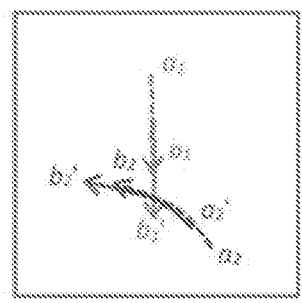
Figure 5C:
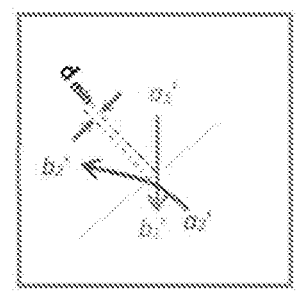
Figure 5D:
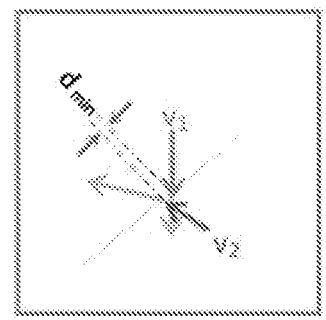
Figure 5E:
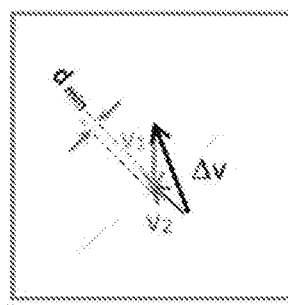

FIG. 5A references FIGS. 4A-4D and shows the progression of the trajectories from FIGS. 4A-4D as the tracking prism slides along the time (t) axis. The original prism is shown in gray; the new prism (after sliding) is shown in purple. The original trajectories (a1->b1; a2->b2) in FIGS. 4A-4D become a1'->b1' and a2'->b2', which can be seen in FIG. 5B. FIG. 5C illustrates a scenario where, although the two trajectory lines intersect, the shortest distance is not zero because the time dimension (t) was also used to define the "distance." FIG. 5D illustrates a scenario where velocities (v1 and v2) before the dmin are obtained by connecting the starting point of each respective trajectory to the points for measuring dmin, i.e., conflict points, then divided by the corresponding time intervals for the portions of the trajectories. In FIG. 5E, the velocity vector difference, Δv, before the conflict points is shown. Its magnitude and direction can be derived from vector subtraction. Given the angle between v1 and v2, θ, the magnitude of Δv can be calculated according to the following formula:

$$|\Delta v| = \sqrt{|v_1|^2 + |v_2|^2 - 2|v_1||v_2|\cos(\theta)} \qquad (4)$$

FIGS. 5A-5E illustrate the minimum separation tracked by a sliding prism of size (Δx, Δy, Δt). It shows the progression of the trajectories in FIGS. 4A-4D as the tracking prism slides along the time dimension, which results in a smaller minimum separation (dmin).

The process of finding conflict points based on minimum separation, estimating equivalent velocity measures prior to the conflict point for each trajectory, and calculating relative velocity, is carried out in real time as the tracking prism slides one frame at a time in synchronization with live or streaming video sources.

Conflict events may be identified based on the minimum separation (dmin) defined in the (x, y, t) domain. Given the tracking prism at any time t, a unique dmin is computed and used for conflict identification. As the prism slides, dmin may change. As FIGS. 5A-5E show, a conflict occurrence was first recorded in FIGS. 4A-4D. However, as the prism slides, a smaller separation (dmin) results for the same conflict event. In that case, the smaller dmin will be retained. For a particular conflict event, the smallest dmin and the corresponding conflict points will be recorded and used for evaluating the conflict event.

Figure 6:
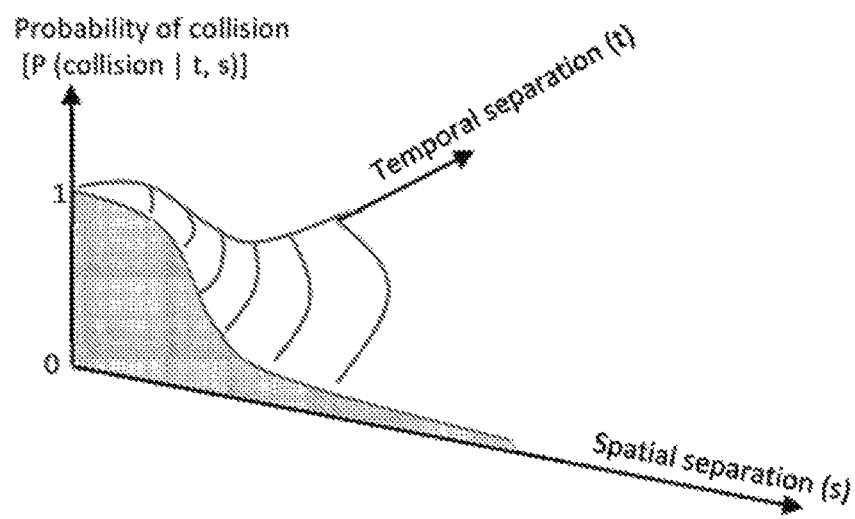
FIG. 6 shows how collision probability is a function of spatial (s) separation and temporal (t) separation.

The conflict severity is quantified by considering the probability of a collision conditional upon the minimum separation of conflicting trajectories in the joint spatial and temporal domain. Thus, the probability of a collision is a function of spatial (s) separation and temporal (t) separation as FIG. 6 shows.

The smaller the separation (both temporal and spatial) is, the higher the probability of collision will be. As the separation become larger, the probability of collision reduces. To simplify computation, we could combine the temporal and spatial dimensions and replace them with minimum separation (dmin) defined in Expression 3.

As such, two boundary conditions exist: (1) If the minimum separation (dmin) is equal to or less than the value limited by the physical dimensions of vehicles (as FIG. 3A shows), a collision has occurred, implying the probability of collision is equal to 1.0, (2) As the minimum separation (dmin) becomes large enough, the probability of collision approaches zero.

By using the minimum separation (dmin) defined in Expression 3, the boundary conditions can be written as conditional probability as follows:

$$P(\text{collision}|d_{min})=1, \text{ when } d_{min}=0 \quad (1)$$

$$P(\text{collision}|d_{min})=0, \text{ when } d_{min} \geq d_{safe} \quad (2)$$

Condition (1) indicates that the collision has occurred when the minimum separation is zero, implying the physical contact of objects or vehicles.

Condition (2) indicates that the collision is impossible when the minimum separation is larger than a separation threshold value that is considered safe, $d_{safe}$.

To determine a proper value for dsafe, field observational studies may be used. But the commonly used values for perception reaction time (tr) can be referenced. Two values of tr have been adopted in practice. tr=1.0 second has been used for timing the yellow change of traffic signals and tr=2.5 seconds has been used for computing safe stopping distances for highway geometric design [AASHTO 2011]. The shorter tr=1.0 is due to the fact that driver response to the yellow indication is an expected condition. Those tr values together with a selected speed (e.g., design speed, posted speed, or operating speed) can be used to derive a proper value for safe separation, dsafe. Note that spatial separation and temporal separation are exchangeable. The spatial separation can be determined by multiplying temporal separation and speed. It should be pointed out that safe separation is contextual, varies depending on crash types, and should be determined based on application contexts.

By considering the two boundary conditions, described previously, some specific functional forms can be used for computing the collision probability depicted in FIG. 6. The simplest form would be a linear function and can be expressed in Eq. 5.

$$P(\text{collision}|d_{min}) = 1 - \frac{d_{min}}{d_{safe}} \quad (5)$$

Note that collision risk typically reduces dramatically within the range of smaller separations, the following expression (Eq. 6) could be adopted:

$$P(\text{collision}|d_{min}) = \frac{2}{1 + e^{c\left(\frac{d_{min}}{d_{safe}}\right)}} \quad (6)$$

where c is a parameter that determines how fast the probability of collision drops as $d_{min}$ increases.

Figure 7:
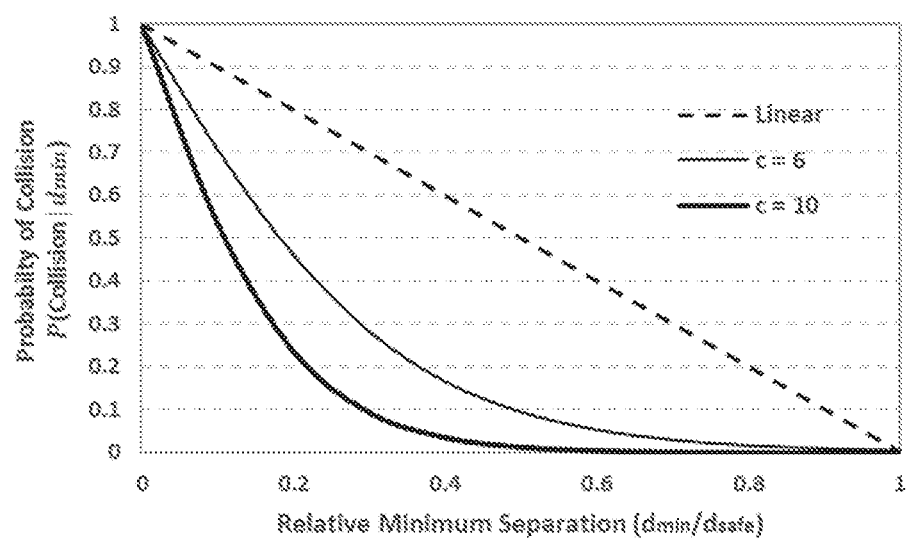
FIG. 7 shows examples of functional forms for computing collision probability based on minimum separation (dmin).

For illustration, the linear function (Eq. 5) and non-linear function (Eq. 6) with different parameters (c=6 and c=10) are plotted in FIG. 7.

The two expressions (Eqs. 5 and 6) are shown as examples to illustrate the concept. Other function forms can be selected if they satisfy (strictly or loosely) the two boundary conditions described above. Once the inventive method and system is implemented and adequate conflict data are acquired, the collision probability functions (e.g., Eqs. 5 and 6) should be calibrated using acquired conflict data.

Because the inventive method and system identifies and quantifies traffic conflicts, the size of the sliding window, Δt, should be selected to accommodate two competing objectives: (1) Δt should be large enough to cover nearly "all" potential conflicts, i.e., probability of a conflict>0; and (2) Δt should be small enough to reduce computational cost and render real-time application.

Given the probability of collision, conditional upon temporal-spatial separation and velocity difference, the severity of a conflict can be computed as shown in Eq. 7 below:

$$\text{Conflict Severity}=P(\text{collision}|t,s) \cdot |\Delta v| \text{ where, } |\Delta v|= \sqrt{|v_1|^2+|v_2|^2-2|v_1||v_2|\cos(\theta)} \quad (7)$$

Figure 8:
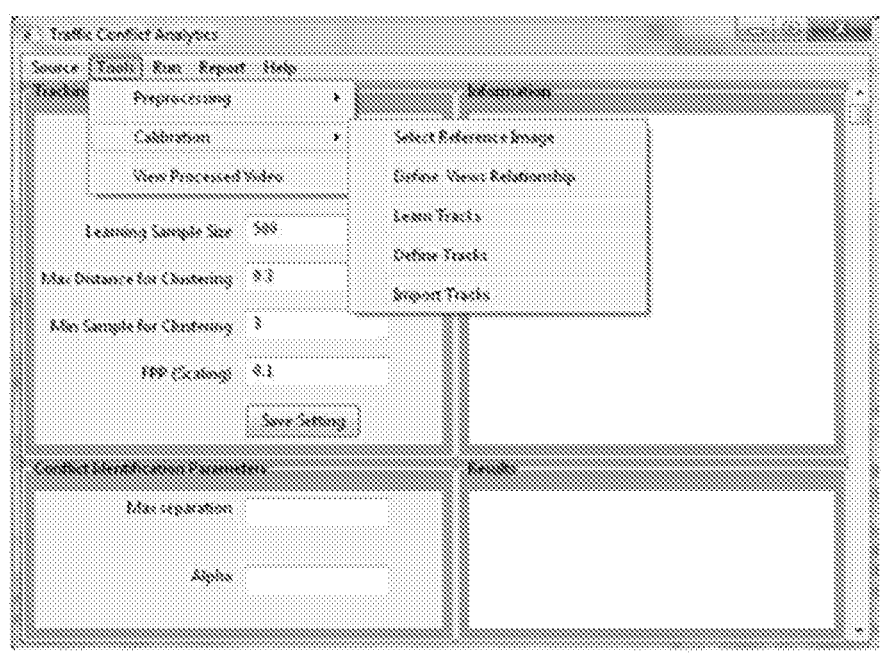
FIG. 8 shows a sample screenshot of a computer implementing a program for algorithms to continuously process and analyze sequential images from a traffic monitoring video.

A computer program that implements the algorithms discussed above has been developed to continuously process and analyze sequential images from a traffic monitoring camera, which has typically been used by highway agencies for monitoring traffic at intersections or along roadway sections. FIG. 8 shows a sample screenshot for such a program.

The procedure to calibrate a probability-of-collision function is as follows:

1. Continuously log or record separation (dmin) for specific collisions (e.g., northbound left turn movement and southbound through movement) for a specified period of observation.

2. Obtain frequency and distribution of separations (dmin) logged over the period of observation.

3. Use the frequency and distribution of dmin to calibrate the probability-of-collision function based on Eq. (8).

$$P(\text{collision}| d_{min} = s) = \quad (8)$$

$$\frac{P(d_{min} = 0)}{P(d_{min} = s)} = \frac{\text{Frequency of } d_{min} = 0 \text{ (i.e., Freqency of colision)}}{\text{Frequency of } d_{min} = s}$$

where, P indicates probability function; s indicates a particular value of separation ($d_{min}$).

A hypothetical example illustrating the calibration procedure is detailed in the following Table (Table 1) and FIG. 16. Table 1

TABLE 1

| Separation (s, in second) | Observed Frequency | Relative Frequency | P (Collision \| $d_{min}$ = s) $\left(\frac{\text{Frequency of } d_{min} = 0}{\text{Frequency of } d_{min} = s}\right)$ |
|---|---|---|---|
| 0.00 | 2 | 0.00040 | 1.00000 |
| 0.10 | 6 | 0.00121 | 0.33333 |
| 0.20 | 10 | 0.00201 | 0.20000 |
| 0.30 | 50 | 0.01006 | 0.04000 |
| 0.40 | 100 | 0.02013 | 0.02000 |
| 0.50 | 200 | 0.04025 | 0.01000 |
| 0.60 | 300 | 0.06039 | 0.00651 |
| 0.70 | 500 | 0.10064 | 0.00400 |
| 0.80 | 800 | 0.16103 | 0.00255 |
| 0.90 | 1000 | 0.20129 | 0.03200 |
| 1.00 | 2000 | 0.40258 | 0.00100 |
| Total: | 4968 | | |

Figure 16:
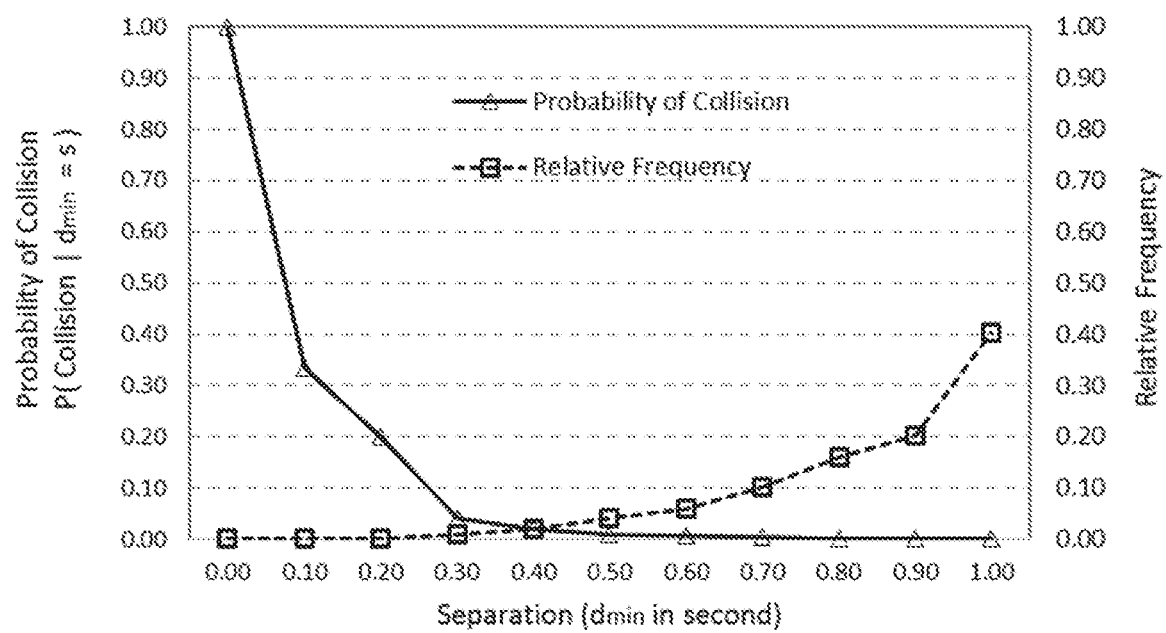
FIG. 16 plots a probability of collision and relative frequency (y axes) against separation (x axis) using data from a hypothetical example to calibrate a probability-of-collision function.

As FIG. 16 shows, the triangle markers (on the solid line) indicate the probability of collision estimated from conflict frequency data. They can be used to calibrate the probability function (e.g., Eq. 6) by curve-fitting techniques.

The probability of collision is related to the separation measure defined in (x,y,t) domain. Collision is just a special case of conflict when the separation reduces to zero (0). In a collision scenario, a conflict is always registered first prior to the collision when the two conflicting vehicles (objects) approach each other close enough (i.e., $d_{min} < d_{safe}$). If the separation ($d_{min}$) continues to reduce till the conflicting vehicles eventually come into contact (i.e., $d_{min}=0$), a collision occurs.

Because of the temporal dependency of conflict and collision, the probability of collision (or risk of collision) conditional upon a separation ($0 < d_{min} < d_{safe}$) can be estimated by Eq. 8. Based on Eq. 8, the probability of collision conditional upon $d_{min}=s$ can be interpreted as the proportion of conflict events with a separation of $d_{min}=s$ that eventually led to a de facto collision.

The calibration should be conducted regularly to capture any changes in drivers' behavior and technologies.

Figure 9A:
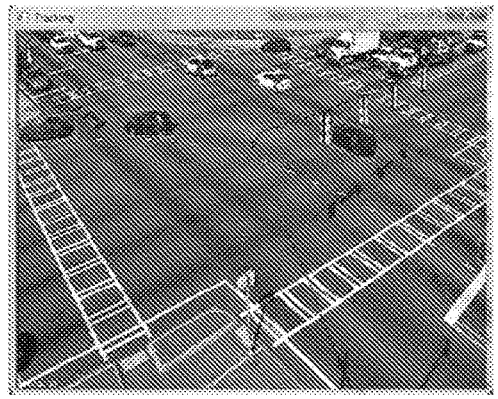
FIGS. 9A-9D show two tracking methods, with FIGS. 9A-9B showing tracking within regions of interest (ROIs) defined as quadrilaterals, and FIGS. 9C-9D showing tracking by movements within each defined track polygon.
Figure 9B:
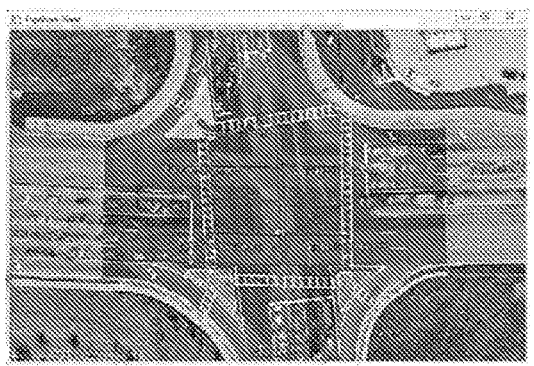
Figure 9C:
Figure 9D:
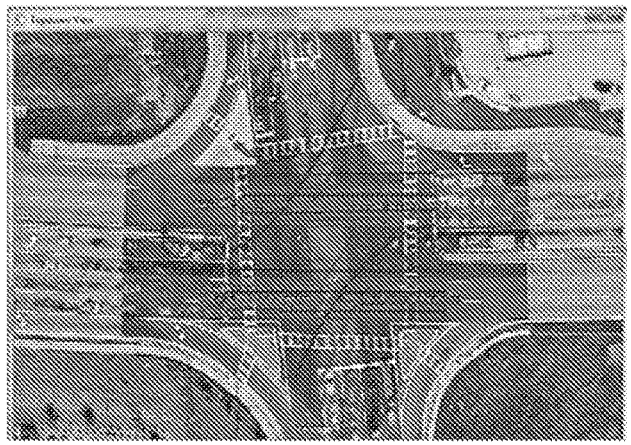

FIGS. 9A-9D show two tracking methods. In one method of tracking within regions of interest (ROIs), multiple ROIs are defined (four in this example) and trajectories are extracted within each ROI (FIGS. 9A-9B). FIG. 9A illustrates vehicle tracking in the camera view. FIG. 9B illustrates trajectories within ROIs in the plan view. In FIG. 9B, the orientations of the ROIs are shown in blue lines, while tracked trajectories are shown in green lines. FIGS. 9C-9D shown an alternate method wherein ROIs are tracked by movements (track polygons). Track polygons may be defined, and trajectories may be extracted within each track polygon. Each movement may be represented by a track polygon identity. This may allow the type of conflict to be identified and geographically located. In FIG. 9C, vehicle tracking in the camera view is illustrated. In FIG. 9D, trajectories within track polygons in plan view are illustrated. In FIG. 9D, the orientations of track polygons are shown as blue lines and tracked trajectories within track polygons are shown in green lines.

Effectiveness of the Algorithm Demonstrated Through Simulation

To test the algorithm, some conflict events were simulated. The simulation video was processed by the proposed algorithm. Some characteristic images (FIG. 10A-10E) were extracted sequentially from the video. It demonstrated how the algorithm is capable of successfully detecting a conflict. To understand the scenario described below, the reader should be reminded that the trajectories shown on the aerial view images (to the right) are lagging with respect to the vehicle positions shown on the left. For discussion of FIG. 10A-10E below, we refer "North" as pointing up.

Figure 10A:
FIGS. 10A-10E show results of a simulation to test a conflict-determining algorithm in accordance with an embodiment of the present disclosure.

FIG. 10A illustrates a southbound left-turning vehicle (yellow) and a northbound through-vehicle (white) approaching each other. The two green lines (on the right) show the trajectories of the two vehicles.

Figure 10B:
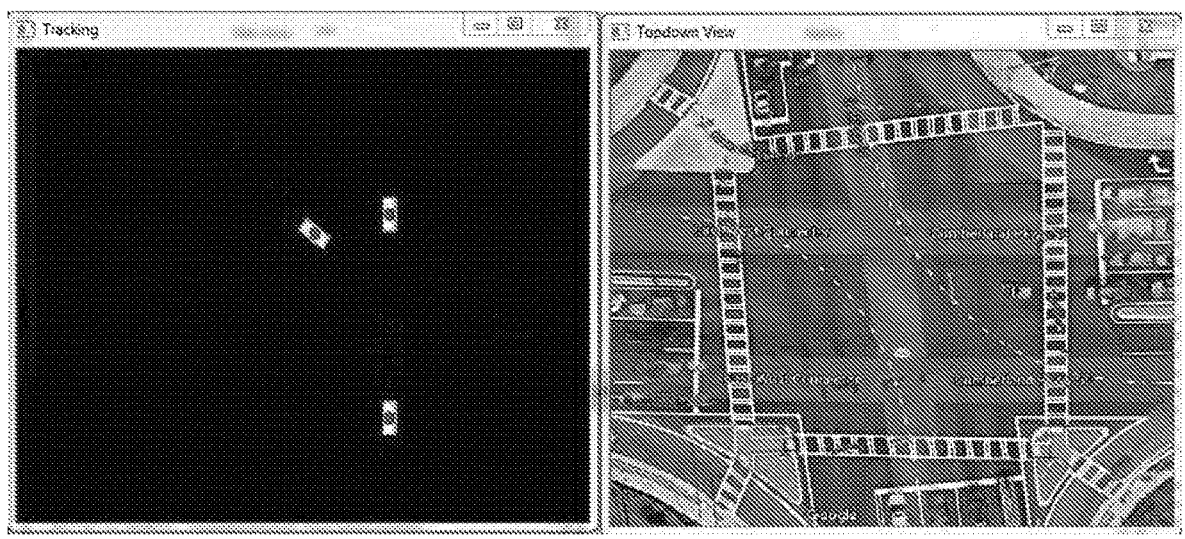

FIG. 10B illustrates the southbound left-turning vehicle decelerating to yield to the opposing northbound through vehicle. The deceleration can be discerned as the shorter trajectory line (in green) as compared to the longer trajectory line in FIG. 10A). It should also be noted that a second northbound through vehicle shows up.

Figure 10C:
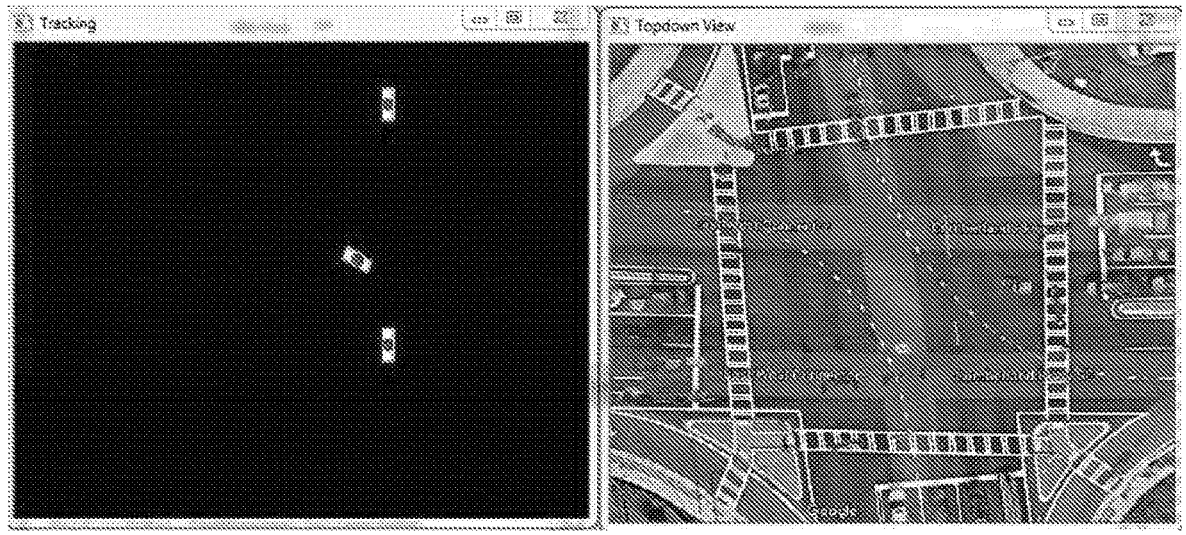

In FIG. 10C, the northbound left-turning vehicle continues to turn without yielding to the second approaching northbound through vehicle.

Figure 10D:
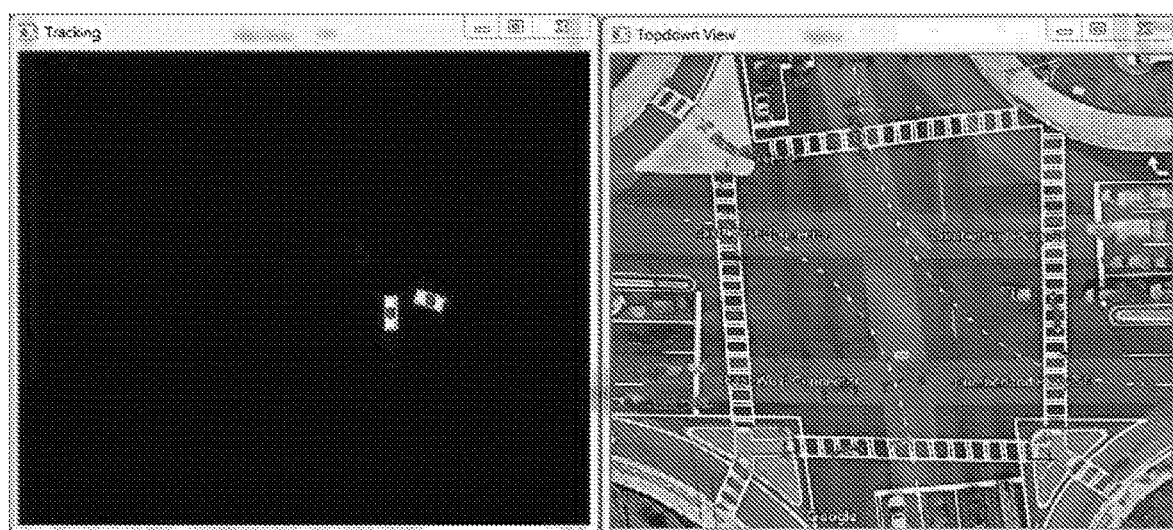

In FIG. 10D, the left-turning vehicle passed in front of the second northbound through vehicle. The longer green line on the top is the remaining trajectories (lagging) of the first northbound through vehicle, which has left the scene.

Figure 10E:

Referring to FIG. 10E, the second through vehicle continues traveling northbound; the left-turning vehicle completed its southbound turn and now is traveling eastbound. Because of the lagging nature of the trajectories, a near miss conflict was subsequently detected (as seen by the two arrows in pink on the right side). The longer arrow associated with the southbound left-turning vehicle indicates a faster speed of the left-turning vehicle as compared to the shorter arrow for the second northbound through vehicle, which indicated a slow-down to avoid the potential collision.

Characterization of Conflict Events for Logging/Recording

The conflicts can be characterized based on the following attributes for logging and storing purposes. The data packet transmitted for each conflict event should include at minimum the following variables or attributes:

Intersection: indicates the monitoring location, where the conflict is detected.

time: the time when the conflict occurs

C_type: one of the conflict types illustrated FIG. 3A-3D s1: the speed prior to the conflict point for conflicting vehicle 1 a1: the angle that vehicle 1 approaches the conflict point on its trajectory (the angle is defined in the range of 0-360 degree by referencing a starting point, e.g. 0 degree as being pointing up and the angle being measured counter-clockwise).

s2: the speed prior to the conflict point for conflicting vehicle 2 a2: the angle that vehicle 2 approaches the conflict point on its trajectory.

st1_x: x coordinate of the starting point on the captured trajectory of vehicle 1 st1_y: y coordinate of the starting point on the captured trajectory of vehicle 1 cp1_x: x coordinate of the conflict point on the captured trajectory of vehicle 1 cp1_y: y coordinate of the conflict point on the captured trajectory of vehicle 1 st2_x: x coordinate of the starting point on the captured trajectory of vehicle 2 st2_y: y coordinate of the starting point on the captured trajectory of vehicle 2 cp2_x: x coordinate of the conflict point on the captured trajectory of vehicle 2 cp2_y: y coordinate of the conflict point on the captured trajectory of vehicle 2 min_dist: minimum distance between the two conflict points on the two trajectories (computed by Eq. 3 and illustrated in FIG. 3).

delta_v: velocity difference of the two conflicting vehicle approaching to their conflict points (Eq. 4 and Eq. 7).

P: probability of collision, indicated in FIG. 6. and FIG. 7., can be computed per Eq. 5 and Eq. 6.

severity: the severity of conflict defined in Eq. 7.

Example Embodiments of a User Interface

Figure 11:
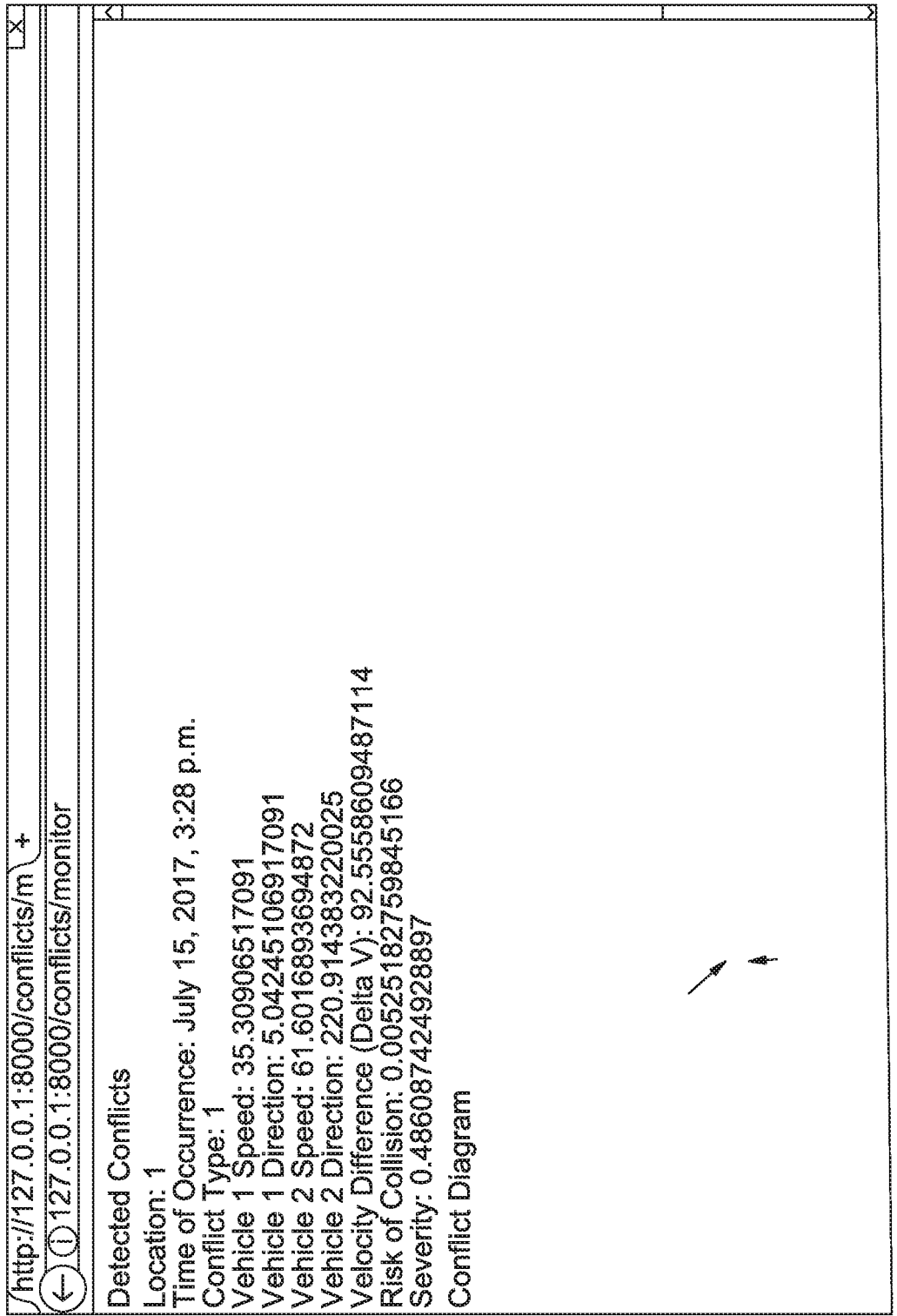
FIG. 11 shows a screen capture of a monitoring site, which shows a specific conflict being logged in real time with a conflict diagram, according to an embodiment of the present disclosure.

FIG. 11 shows a screen capture of a monitoring site, which shows a specific conflict being logged in real time with a conflict diagram.

FIG. 12 shows a screen capture of a site administrator interface, which shows a specific conflict and all related attributes being logged by a server.

FIG. 13 shows a screen capture of a database interface with multiple conflict events that are being or have been recorded.

Deployment Schemes of the Proposed System

Figure 14:
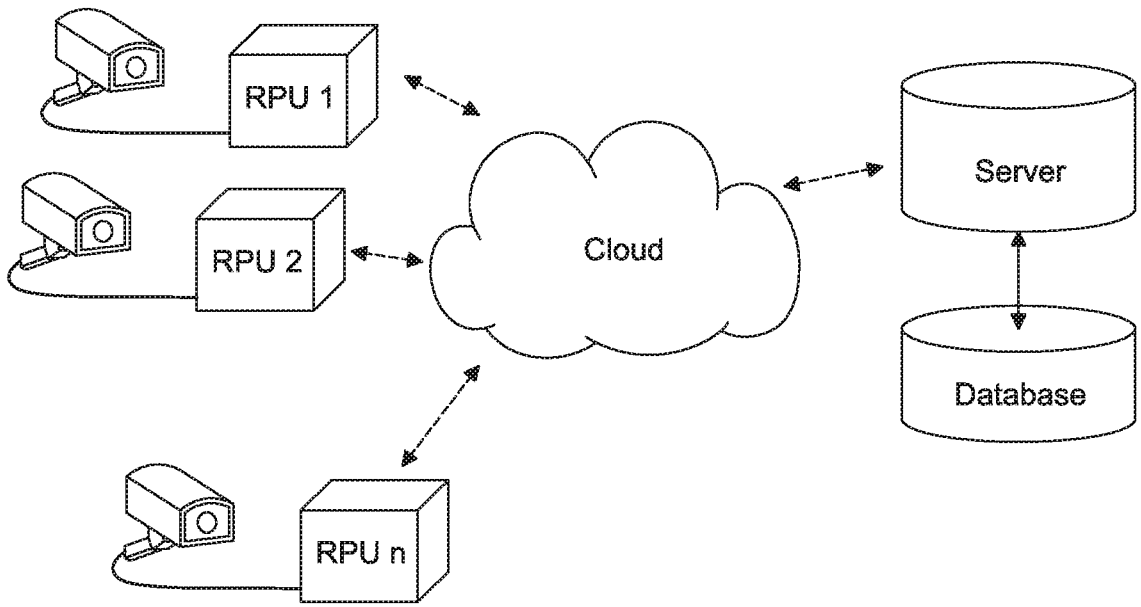
FIG. 14 shows a schematic of a distributed system in accordance with an embodiment of the present disclosure.

Deployment of the system can be accomplished in one of the two ways: a distributed system, or a centralized system. For the distributed system, a road processing unit ("RPU") is required to process live video locally at each site being monitored. The processing unit will perform functions, including video processing, detecting, classifying and quantifying conflict events in real time. Once a conflict is detected, the conflict characteristic data will be transmitted via Cloud to a server, which may be located in a traffic management center. The server will keep logging all conflicts received from all the sites being monitored and store those conflict data in a database. A database server is required to perform data analytics on the conflict data accumulated in the database. A schematic of a distributed system is shown in FIG. 14. Since the amount of data transmitted over the Cloud is small (i.e., only derived conflict characteristic data is transmitted), not much network bandwidth is required.

Figure 15:
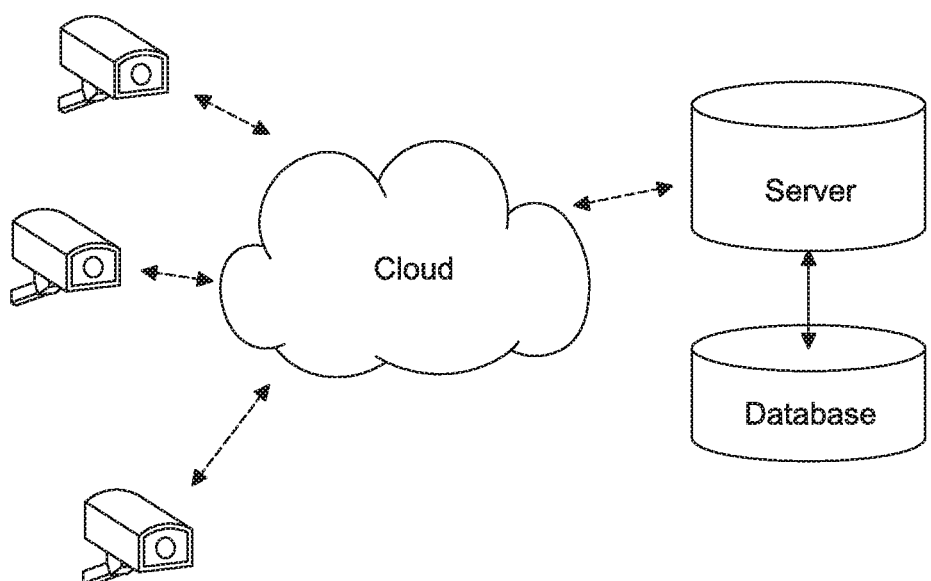
FIG. 15 shows a schematic of a distributed system in accordance with an alternate embodiment of the present disclosure.

For the centralized system, the road processing units are eliminated and the video from field cameras (e.g., internet protocol or IP cameras) will be streamed via Cloud to Server directly, and all video processing and analytics will be carried out on the server in the management center. A schematic of the centralized system is shown in FIG. 15. Since all video data will be transmitted (streamed) over the Cloud, the network bandwidth for data transmission needs to be large enough for real-time application.

The embodiments shown and described in the specification are only specific embodiments of inventors who are skilled in the art and are not limiting in any way. Therefore, various changes, modifications, or alterations to those embodiments may be made without departing from the spirit of the invention in the scope of the following claims. The references cited are expressly incorporated by reference herein in their entirety.

What is claimed is:

1. A video analytics method comprising the steps of
obtaining a sequence of real-time images as input from a traffic monitoring system;
identifying a plurality of vehicles within a pre-defined region of interest; and
detecting, using the sequence of real-time images, a conflict event when trajectories of at least two of the vehicles are within a pre-determined maximum separation threshold in a spatial-temporal domain.

2. The video analytics method of claim 1 further comprising the step of classifying the conflict event.

3. The video analytics method of claim 1 further comprising determining a collision probability based on a computed minimum separation and a pre-determined safe separation threshold.

4. The video analytics method of claim 1 where the step of detecting a conflict event includes determining a separation measure between trajectories of at least two vehicles and comparing a computed separation measure to the pre-determined maximum separation threshold, the separation measure being determined according to the following equation:

$$d = \sqrt{\min_{x,y,t}\{\omega[(x_i - x_j)^2 + (y_i - y_j)^2] + (1 - \omega)(t_i - t_j)^2\}}$$

subject to: $(x_i, y_i, t_i) \in$ trajctory i and $(x_j, y_j, t_j) \in$ trajctory j
where, $\omega$ is a weighting factor between spatial separation and temporal separation, $(x_i, y_i, t_i)$ and $(x_j, y_j, t_j)$ are points on the trajectories of the vehicles.

5. The video analytics method of claim 1 further comprising the step of comparing respective velocities of the vehicles.

6. The video analytics method of claim 5 further comprising the step of determining a velocity vector difference $\Delta v$ using the equation $$|\Delta v| = \sqrt{|v_1|^2 + |v_2|^2 - 2|v_1||v_2|\cos(\theta)}$$

where $v_1$ is the velocity vector of a first vehicle, $v_2$ is the velocity vector of a second vehicle, and $\theta$ is the angle between the first velocity vector and the second velocity vector.

7. The video analytics method of claim 6 further comprising the steps of
determining a collision probability based on the temporal-spatial separation of the vehicles; and determining a conflict severity value by multiplying the collision probability by the magnitude of
the velocity vector difference.

8. The video analytics method of claim 6 further comprising the step of implementing a corrective action with respect to the region of interest to reduce the collision probability.

9. A method comprising the steps of
obtaining a spatial and temporal position (x, y, t) of a plurality of moving objects from a video source over a defined tracking prism comprising successive frames;
tracking center points (x, y) of all moving objects and assigning a time stamp (t) relative to the tracking window;
representing the center points (x, y) on a plan view by geospatially referencing the view from the video source onto the plan view, and generating a corresponding sequence of dot-featured image frames on the plan view;
extracting trajectories of moving objects in the tracking prism;
determining a conflict by inspecting trajectories in the tracking prism every time step and determining the separation of the trajectories in the joint spatial-temporal (x, y, t) domain; and
characterizing the conflict based on conflict points in the trajectories.

10. The method of claim 9 where conflict points are points on conflicting trajectories having a minimum separation measured in the (x, y, t) domain, and wherein the approaching velocity of each moving object is computed based on the portion of trajectory prior to its respective conflict point.

11. The method of claim 9 further comprising characterizing the conflict based on a conflict type and a conflict severity measure.

12. The method of claim 11 where the conflict severity measure is determined from a magnitude of difference in approaching velocities of the moving objects defined in claim 10 and a collision probability function conditional on the separation measure in the (x, y, t) domain.

13. The method of claim 9 implemented iteratively by sliding a tracking prism one frame at a time in synchronization with at least one of a live video source and a streaming video source.

14. The method of claim 9 further comprising calibrating a probability-of-collision function based on a plurality of conflict events logged over a specified period of observation, where calibrating the probability-of-collision function includes the following steps:
logging a separation of vehicles ($d_{min}$) in conflict for each conflict for a pre-determined observation period;
obtaining a frequency and a distribution of the logged separations over the pre-determined observation period; and
using the frequency and the distribution of $d_{min}$ to calibrate the probability-of-collision function as follows:

$$P(\text{collision}|d_{min}=s) =$$

$$\frac{P(d_{min}=0)}{P(d_{min}=s)} = \frac{\text{Frequency of } d_{min}=0 (i.e., \text{Freqency of colision})}{\text{Frequency of } d_{min}=s}$$

where P indicates the probability-of-collision function and s indicates a particular $d_{min}$.

15. A video analytics system comprising
at least one camera producing successive images of a region of interest;
a processor configured to access the images from the at least one camera; and
a memory operatively coupled to the processor, the memory including instructions that, when executed by the processor, cause the processor to perform the following steps:
obtaining a sequence of real-time images as input from a traffic monitoring system;
identifying a plurality of vehicles within a pre-defined region of interest; and
detecting, using the sequence of real-time images, a conflict event when a minimum separation of the trajectories of conflicting vehicles is within a pre-determined maximum separation threshold in a spatial-temporal domain.

16. The video analytics system of claim 15 where the memory includes additional instructions that, when executed by the processor, cause the processor to perform the step of determining a collision probability based on a computed minimum separation and a pre-determined safe separation threshold.

17. The video analytics system of claim 15 where the step of detecting a conflict event includes determining a separation measure between trajectories of two or more of the vehicles captured in the tracking prism and comparing the separation measure to the predetermined maximum separation threshold, the separation measure being determined according to the following equation $$d = \sqrt{\min_{x,y,t}\{\omega[(x_i-x_j)^2+(y_i-y_j)^2]+(1-\omega)(t_i-t_j)^2\}}.$$

18. The video analytics method of claim 15 where the memory includes additional instructions that, when executed by the processor, cause the processor to perform the step of comparing respective approaching velocities of the vehicles.

19. The video analytics method of claim 18 where the memory includes additional instructions that, when executed by the processor, cause the processor to perform the step of determining a velocity vector difference Δv using the equation $$|\Delta v|=\sqrt{|v_1|^2+|v_2|^2-2|v_1||v_2|\cos(\theta)},$$

where $v_1$ is the approaching velocity vector of a first vehicle, $v_2$ is the approaching velocity vector of a second vehicle, and θ is the angle between the first velocity vector and the second velocity vector.

20. The video analytics method of claim 19 where the memory includes additional instructions that, when executed by the processor, cause the processor to perform the steps of determining a collision probability based on the temporal-spatial separation of the vehicles; and determining a conflict severity value by multiplying the collision probability by the magnitude of the velocity vector difference.

* * * * *